United States Patent

[11] 3,574,442

| [72] | Inventor | Maurice Michon |
| | | Draveil, France |
| [21] | Appl. No. | 803,044 |
| [22] | Filed | Feb. 27, 1969 |
| [45] | Patented | Apr. 13, 1971 |
| [73] | Assignee | Commissariat A L'Energie Atomique |
| | | Paris, France |
| [32] | Priority | Mar. 1, 1968 |
| [33] | | France |
| [31] | | 142153 |

[54] ELECTRO-OPTICAL PHASE DISPLACEMENT CELL
6 Claims, 4 Drawing Figs.

[52] U.S. Cl.................................................. 350/150, 350/149
[51] Int. Cl................................................... G02f 1/26
[50] Field of Search........................................ 350/147, (Sci Library); 350/149, 150, 160

[56] References Cited
UNITED STATES PATENTS

| 2,467,325 | 4/1949 | Mason | 350/150 |
| 2,649,027 | 8/1953 | Mason | 350/150 |
| 2,705,903 | 4/1955 | Marshall | 350/150 |
| 2,766,659 | 10/1956 | Baerwald | 350/150 |
| 3,041,936 | 7/1962 | Hull | 350/150 |
| 3,389,259 | 6/1968 | Zarem et al. | 350/150X |

Primary Examiner—David Schonberg
Assistant Examiner—Paul R. Miller
Attorney—Cameron, Kerkam and Sutton ABSTRACT: An electro-optical cell for the phase displacement of a polarized light beam comprising two single crystals which exhibit the Pockels effect, the crystals being disposed symmetrically with respect to a flat central electrode and enclosed between two flat lateral electrodes. The principal crystallographic axes of the single crystals are directed at right angles to the flat electrodes. The light beam to be displaced in phase passes through each single crystal in turn in the direction of the crystallographic axes. The cell also comprises a coaxial cable, the flat central electrode being inserted in the central conductor of the cable whilst the flat lateral electrode is inserted in the outer conductor of the cable.

ELECTRO-OPTICAL PHASE DISPLACEMENT CELL

This invention is directed to an electro-optical cell for the phase displacement of a polarized light beam. The cell is particularly intended for use in association with a polarizer-analyzer system so as to constitute a shutter having a very short opening and closing time. This association finds a wide range of applications, especially as a device for triggering a pulsed laser beam.

Electro-optical phase displacement cells which utilize the Pockels effect in a crystal have already been proposed. It is known that this effect consists in the appearance of birefringence in certain crystals when they are subjected to an electric field which is applied along their crystallographic axes. A polarized light beam traverses the crystal along said axis and, if the crystal satisfies certain conditions of wavelength, is subjected to rotational motion of its plane of polarization as it passes through the crystal when an electric field is applied.

The practical means employed up to the present time for the application of the foregoing principle have not proved fully satisfactory in cases where the cell is associated with a polarizer-analyzer system in order to constitute a high-speed shutter. In point of fact, the application of the electric field to cells of the type at present in use can be achieved only by means of conductors have an inductance which impairs the rise time of pulses delivered by the generator and which introduces a propagation delay.

The aim of this invention is to provide a cell which meets practical requirements more effectively than the cells proposed heretofore and in particular which does not carry any of the disadvantages mentioned above. To this end the invention proposes a cell comprising two single crystals which exhibit the Pockels effect, said single crystals being disposed symmetrically with respect to a flat central electrode and enclosed between two flat lateral electrodes, the principal crystallographic axes of the single crystals being directed at right angles to said flat electrodes and said single crystals being traversed successively in the direction of said axes by the beam to be displaced in phase and a coaxial cable for transmitting electric pulses having a steep leading edge, the flat central electrode being inserted in the central conductor of the coaxial cable and the flat lateral electrodes being inserted in the outer conductor of said cable.

The device hereinabove described permits perfect impedance matching and also permits an electric pulse having a very short rise time to traverse the cell without incurring either deformation or attenuation.

The invention consists of additional arrangements which can advantageously be employed in conjunction with the preceding but can also be employed independently. These arrangements will become more readily apparent from the following description of embodiments which are given solely by way of example without any limitation being implied, reference being made to the accompanying drawings, in which.

Figure 1:
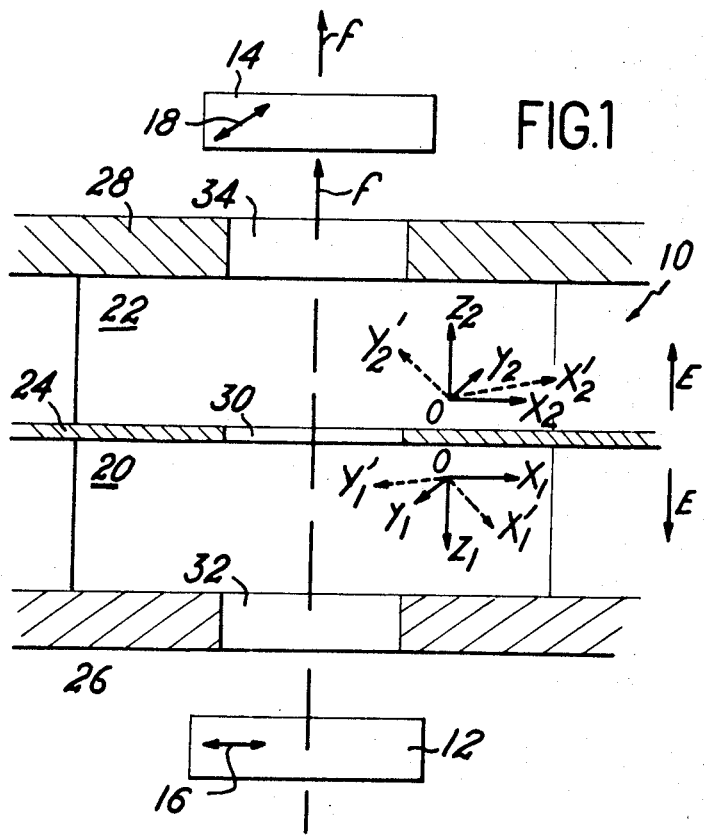
FIG. 1 is a general arrangement diagram showing one form of construction of the cell which is associated with a polarizer-analyzer system.

The cell 10 which is illustrated in FIG. 1 is placed on the path followed by the light which is propagated in the direction of the arrow $f$. The light passes successively through a polarizer 12, the cell 10 and an analyzer 14.

The polarizer and the analyzer are placed so that their planes of polarization 16 and 18 are crossed.

Figure 2:
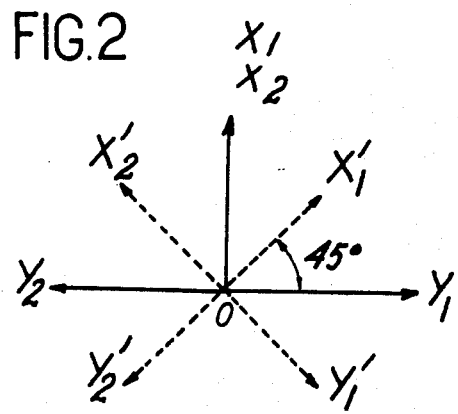
FIG. 2 is a graphical representation of the axes of polarization in a plane which is transverse to the axis of propagation of light.

The cell 10 comprises two single crystals 20 and 22 which exhibit the Pockels effect, said single crystals being placed side by side and cut in such a manner as to ensure that the light beam passes through each crystal in turn along the crystallographic axes $OZ_1$ and $OZ_2$ (as shown in FIGS. 1 and 2) and that the application of an electric field having lines of force directed parallel to said axes should produce birefringence which results in the appearance of two axes, namely the axis $OX'_1$, $OY'_1$ in the crystal 20 and the axis $OX'_2$, $OY'_2$ in the crystal 22 (as shown in FIG. 2); the axes $OX'$, $OY'$ make an angle of 45 degrees with the axes $OX$, $OY$ (as shown in FIG. 1). The single crystals can consist in particular of potassium dihydrogen phosphate $KH_2PO_2$ (abbreviated to KDP) or of ammonium dihydrogen phosphate (abbreviated to ADP).

The two single crystals 20 and 22 are separated by the central electrode 24 which is interposed in the central conductor of the coaxial line which produces the excitation of the single crystals and which is placed at right angles to the arrow $f$. Two electrodes 26 and 28 enclose the crystals and are interposed in the outer conductor of the coaxial line. Apertures 30, 32 and 34 which are aligned in the direction $f$ of the light beam are formed in the central electrode 24 and the lateral electrodes 26, 28. The cell can be designed to have an impedance which is equal to that of the coaxial line.

The operation of the device is apparent from FIG. 2. Thus, when no current is applied to the coaxial line, the single crystals only have the crystallographic axis $OZ_1$, $OZ_2$; the polarized light which is derived from the polarizer 12 traverses the single crystals without any modification of polarization and is not transmitted by the analyzer 14, the plane of polarization 18 of which is perpendicular to that of the light which impinges thereon.

On the contrary, when an electric field which is parallel to the direction of the light is applied to the single crystals by the coaxial line, the Pockels effect is exhibited and results in the appearance in the transverse plane of secondary axes $OX'_1$ and $OY'_1$ in the crystal 20 and $OX'_2$ and $OY'_2$ in the crystal 22. The linearly polarized light wave gives rise to two waves which are linearly polarized in the direction of the axes $OX'_1$ (or $OX'_2$) and $OY'_1$ (or $OY'_2$). The refractive indices for these light waves are $n(x')$ and $n(y')$. The phase difference between these two waves after they have passed through a crystal having a thickness $h$ and in respect of a wavelength $\lambda$ is:

$$\Delta\varphi = \frac{2\pi h}{\lambda}[n(x') - n(y')]$$

The fields applied to the two crystals 20 and 22 being of opposite direction, the phase differences $\Delta\Phi$ produced by the two single crystals are added.

If the applied electric field E is such that, in each crystal, the phase difference between the waves which are polarized along the axes $OX'$ and $OY'$ is equal to $\pi/2$, the total phase difference introduced by the cell is equal to $\pi$. Therefore, if a voltage step $V$ having a leading edge with a fast rise time and corresponding to a total phase difference equal to $\pi$ is applied to the cell, the plane of polarization of the light wave rotates by $\pi/2$ at the time of passage through the cell; the complete polarizer-cell-analyzer assembly changes over from a state in which the light beam is blocked to a state in which it is totally transmitted, or at least with only very small losses.

It should be noted that one advantage of the cell 10 among others is that very short rise times (0.5 nsec. in an actual cell) are accepted without any resultant deformation inasmuch as the cell lends itself to complete impedance matching with the coaxial line (which can form part of a direct current circuit or terminate in a short circuit). This structure is free from any mismatched connections which would introduce a propagation delay and would impair the leading edge of the pulses.

Figure 3:
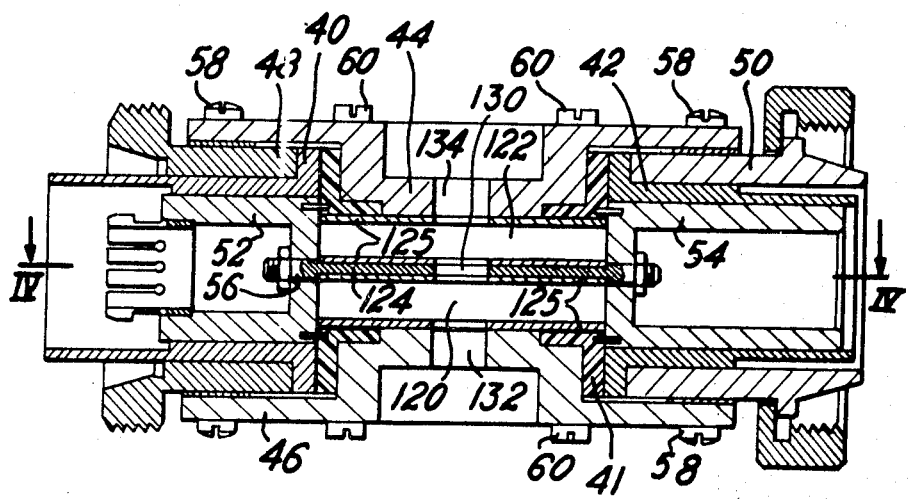
FIG. 3 represents in longitudinal section one practical form of construction of a cell.
Figure 4:
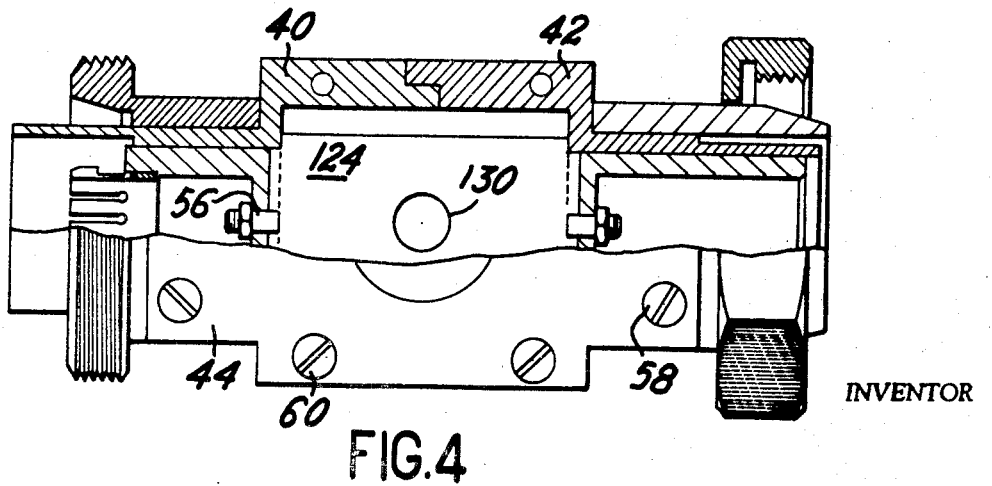
FIG. 4 is a half-sectional view taken along line IV–IV of FIG. 3.

FIGS. 3 and 4 show by way of example a cell which is intended to be inserted in an open coaxial line having an impedance of 10 ohms. The cell comprises two half-shells 40 and 42 formed of insulating material such as polytetrafluorethylene and joined together by means of flanges 44 and 46 forming the lateral electrodes which are pierced by apertures 132 and 134. Said flanges are joined by means of conventional spigots 48 and 50 to the outer conductor of two sections of a coaxial line which is not shown in the FIGS. The central electrode 124 which is pierced by an aperture 130 is mounted between two end fittings 52 and 54 providing a connection with the central conductor of the sections of coaxial line. The end fittings 52 and 54 are separated from the spigots 48 and 50 by the half-shells 40 and 42 of insulating material and packing-pieces 41 which are also formed of insulating material. The central electrode is held in position between the end fittings 52 and 54 by means of rods 56.

The faces of the crystals 120 and 122 are covered with layers of copper and indium plates 125 are inserted between the electrodes and the crystal which is thus covered except in the areas corresponding to the windows 132, 134 and 130. The crystals 120 and 122 of KDP are clamped between the electrodes and complete unit is secured by means of screws 58 and 60.

In an alternative form of construction which is not illustrated in the drawings, the coaxial cable is short-circuited at the output of the cell which differs from the form of construction described in the foregoing only in the presence of a terminal conductive disc between the flanges 44 and 46 at the output of the cell; this ring replaces the end fitting 54 and provides a connection between the electrodes.

As is readily apparent, the arrangements herein described have been given solely by way of example and a number of different modifications could be contemplated without thereby departing from the scope of the invention.

I claim:

1. An electro-optical cell for the phase displacement of a polarized light beam comprising two single crystals which exhibit the Pockels effect, a flat central electrode, said single crystals being disposed symmetrically with respect to said flat central electrode, two flat lateral electrodes enclosing said crystals, the principal crystallographic axes of said single crystals being in opposite directions and directed at right angles to said flat electrodes, said single crystals being traversed successively in the direction of said axes by a light beam polarized parallel to said flat electrodes to be displaced in phase, and a coaxial cable, a central conductor and an outer conductor for said cable, said flat central electrode being electrically connected in said central conductor of said coaxial cable and said flat lateral electrodes being electrically connected in said outer conductor of said cable.

2. An electro-optical cell in accordance with claim 1, including apertures in said electrodes for passage of the light beam.

3. An electro-optical cell in accordance with claim 1 forming a shutter including a polarizer and an analyzer having crossed polarization planes, said polarizer and said analyzer being aligned along the axis of passage of the light beam and disposed on opposite sides of the cell.

4. An electro-optical cell in accordance with claim 1, said crystals being covered with a layer of material providing a connection with said electrodes.

5. An electro-optical cell in accordance with claim 4, said material being indium.

6. An electro-optical cell in accordance with claim 1, said crystals being oriented to add the phase differences caused by the Pockels effect.